Patented Jan. 30, 1951

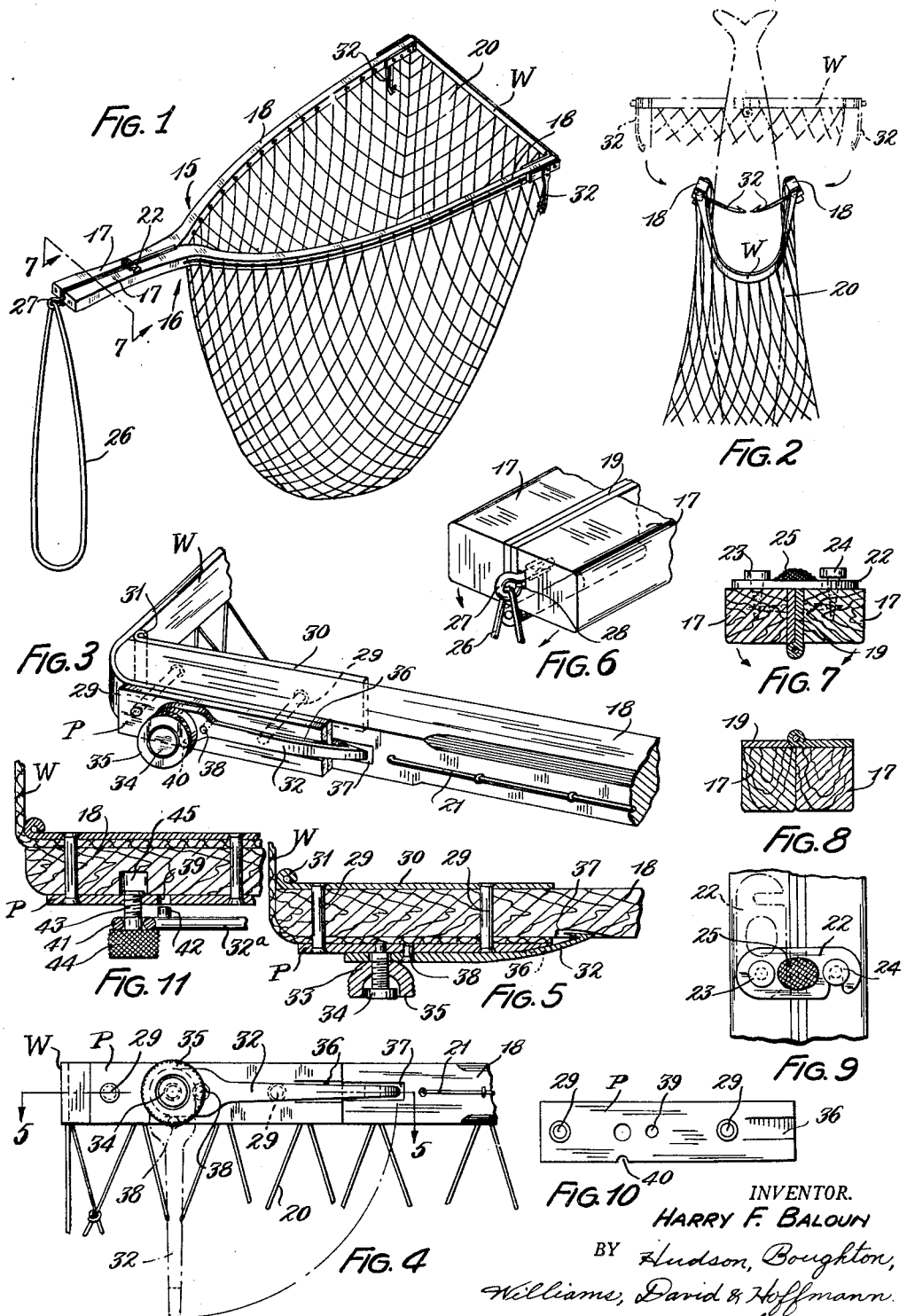

2,539,563

UNITED STATES PATENT OFFICE 2,539,563

GAFFING AND LANDING NET

Harry F. Baloun, Cleveland, Ohio

Application June 9, 1949, Serial No. 97,987

12 Claims. (Cl. 43—12)

This invention relates to a fishing gaff and to a landing net and more particularly to a combined fishing gaff and landing net.

Hand nets used by fishermen to land fish which have been hooked have the disadvantage that the fish struggling as they enter the net and are being lifted from the water frequently manage to free themselves from the net and drop back into the water. This makes the landing of fish by the usual net difficult and many times results in the loss of hooked fish. Also the fish in struggling free from the net is apt to entangle the net and the fishing line, particularly where multi-hook plugs are being used. In using the ordinary landing net it is often necessary for a second fisherman to assist the first fisherman in landing the fish by using a separate gaff to gaff the fish which has struggled out of the landing net. It is difficult to gaff a fish while it is in the water since the fish is not supported and is free to move away under the thrust of the gaff.

An object of the invention is to provide a combined gaff and landing net which is so constructed that as the fish enters the net, the latter collapses and automatically gaffs the fish thus precluding all likelihood of the fish struggling free from the net.

A further object is to provide a fish gaff which includes a collapsible frame carrying the gaff hooks and a web interconnecting spaced frame members and on which web the fish is supported and located and then gaffed automatically by the collapsing of the frame.

Another object is to provide a combined gaff and landing net wherein the gaff proper can be quickly and conveniently arranged in an inactive position where it will not become entangled in brush or the like and where the landing net can be employed as the ordinary collapsible landing net or the net can be collapsed and folded for storing, packaging or for transportation.

A still further object is to provide a combined gaff and landing net which may be readily manipulated by one hand to land and gaff the fish thus leaving the other hand of the fisherman free to handle the line.

A further object is to provide a combined gaff and landing net which is so constructed and the gaffing means so located that the fish while supported by a portion of the net and during collapsing of the net will be gaffed rearwardly of its gills with the gaffing means extending through the vital organs of the fish thus insuring that the struggling convulsions of the fish will quickly be terminated and the fish securely gaffed and prevented from getting out of the net.

Another object is to provide a combined gaff and landing net wherein the weight of the fish entering the net acts as the net is raised to collapse the net and cause the gaffing means to gaff the fish.

A still further object is to provide a combined gaff and landing net as referred to in the above stated objects and which is of simple construction, is readily opened for use or collapsed for storage, packaging or transportation and which is effective in preventing the loss of struggling fish being landed by the net.

Further and additional objects and advantages not hereinbefore specified will become apparent hereinafter during the detailed description of embodiments of the invention which is to follow and which embodiments are illustrated in the accompanying drawing wherein:

Fig. 1 is a perspective view of a combined gaff and landing net embodying the invention, with the net in the open position ready for use and prior to collapsing and with the gaffing means shown in its active position.

Fig. 2 is a fragmentary somewhat schematic illustration of the landing net and is taken looking toward the open end of the net, the net being illustrated in open position by dot and dash lines and in collapsed position by full lines, with the fish being indicated by dot and dash lines as partially in the net and gaffed, the path of movement of the gaffing means from the full open net position to the collapsed position being indicated by arrows.

Fig. 3 is a fragmentary enlarged perspective view of the net shown in Fig. 1 and illustrates the gaffing means on one side of the net when said means is arranged in its inactive position.

Fig. 4 is a fragmentary side elevational view of that portion of the net shown in Fig. 3 and indicates the active position of the gaffing means by dot and dash lines.

Fig. 5 is a fragmentary longitudinal sectional view taken substantially on line 5—5 of Fig. 4 looking in the direction of the arrows.

Fig. 6 is a fragmentary perspective view of the end of the handle portion of the net frame.

Fig. 7 is a transverse sectional view taken substantially on line 7—7 of Fig. 1 looking in the direction of the arrows, and shows the handle portions of the net frame when the latter is in open position together with the positive latch means that retains the net frame in open position.

Fig. 8 is a sectional view through the handle portion of the net frame but showing the relationship of the handle portions when the net is collapsed and with the positive latch means omitted.

Fig. 9 is a fragmentary top plan view of the handle portions of the net frame showing in full lines the positive latch means in latched position and in dash lines in unlatched position.

Fig. 10 is a detail view of the mounting plate for the gaffing means shown in the previous views, and Fig. 11 is a fragmentary sectional view similar to Fig. 5 but illustrating a modified form of gaffing means and mounting therefor which may be employed.

The net embodying the invention comprises two main frame members 15 and 16. These members may be formed of any suitable material having a degree of resiliency and preferably possesses buoyance as, for example, the main frame members may be formed of wood, plastic or any other suitable buoyant material. For purposes of illustration the main frame members 15 and 16 are shown as formed of wood and each includes a handle portion 17 and a bowed portion 18. The main frame members 15 and 16 are hingedly connected together at the juxtaposed handle portions 17 by means of suitable hinges, such as piano hinges 19 secured to the handle portions while the bowed portions 18 are separated.

The frame members can be swung from open net position, as indicated in Fig. 7, to collapsed net position as indicated in Fig. 8, it being noted that the swinging movement of the frame members from open net position to collapsed net position follows a downwardly extending arcuate path.

When the frame members are in open net position the two leaves of the hinge means are in contact and the axis of the hinge means is located slightly below the plane of the lower surface of the frame members.

When the frame members are in collapsed net position, as shown in Fig. 8, the leaves of the hinge means are in substantially the same horizontal plane and are located uppermost of the frame members.

The outer ends of the frame members are interconnected by a web W which places the bowed portions 18 under tension. The term "web" as used in this specification and in the claims is intended to mean a strip, ribbon, cord or other elongated relatively narrow piece of material.

The web W exerts a tensioned pull on the frame members tending to maintain the same in net open position. However, when a fish is entering the net over the web W and the net is being raised to lift the fish from the water the weight of the fish on the web W tends to move the frame members about the hinge axis from net open position to net collapsed position.

The web W may be formed of any suitable material and attached to the outer ends of the bowed portions 18 of the frame members in any desired way. However, one preferred way of attaching the web W to the outer end of the frame members is to have the ends of the web extend around the ends of the frame member in contact with the outer sides thereof and clamped to the frame members by means of plates P rigidly secured to the frame members as will later be explained.

The web W is formed preferably but not necessarily of transparent material and may be folded or doubled upon itself so as to have the loops of the cords 20 of the net extending between the folds of the strip and held in place by longitudinal stitches in the strip as fully explained in my copending application Ser. No. 786,307, filed November 15, 1947, now Patent No. 2,536,251, issued January 2, 1951.

Also, as explained in my said copending application, the portions 18 of the frame members may be provided with a series of longitudinally spaced openings through which can pass the loops of the cords 20 of the net. These loops extend around a holding cord 21 which runs longitudinally of the frame members and has its opposite ends passing through the end openings of said series of openings and suitably knotted to maintain the cord 21 in position all as indicated by the holding cord 30 and knot 30a in my copending application Serial No. 786,307.

The frame members are maintained in open net position by positive latch means which is shown as comprising a latch plate 22 pivoted at 23 to the upper side of one of the handle portions 17 and provided at its free end with a slot which can be engaged with a keeper pin 24 secured to the upper side of the other handle portion 17, all as clearly indicated in Figs. 7 and 9.

In order to facilitate the release of the latch plate 22 and its movement from the full line position of Fig. 9 to the dot and dash line position thereof, said plate is provided with a raised knurled thumb pad portion 25, wherefore the fisherman can manipulate the net with one hand and by means of his thumb readily release the latch when he desired to change the condition of the net from open net position to collapsed net position.

As is usual in nets of this general character an elastic loop 26 is attached to the net and by means of which the fisherman suspends the net from his shoulder and assuming that the net is in the collapsed position and it is desired to open the same it is merely necessary for him to unwrap the net and move the frame members from collapsed to open net position by a single hand manipulation. The elastic loop 26 extends through an eye 27 which instead of being screwed into one of the handle portions 17 extends into a slot 28 formed in the handle portion and covered by one of the hinge leaves of the hinge means 19. The eye 27 can then have its shank welded to the hinge leaf forming a secure and permanent attachment for the eye as distinguished from an eye that would be screwed into the handle portion and might work loose and the net be lost.

The plates P which clamp the ends of the web to the outer ends of the frame portions 18 are held in position by suitable rivets 29 extending through the plates P and through the frame portions 18 as well as through inner plates 30 located on the inner sides of the frame portions 18 as clearly indicated in the drawings and provided at their ends adjacent to the web W with rounded portions 31 about which the web W can bend in collapsing and opening the net without forming in the web W creases which might eventually cause the web to wear out.

A metal gaff hook 32 is pivoted on a shouldered threaded stud 33 that is rigidly riveted to the plate P and passes with clearance through an opening in the gaff hook.

The stud 33 is provided at its outer end with a disk-like head 34 which is located interiorly of a cup-shaped clamping nut 35 that screws on the stud. The head 34 acts as a limit stop to retain the nut on the stud and is protected by the nut.

The exterior of the nut 35 may be suitably knurled to facilitate its turning and it will be noted that said nut can be screwed down on the stud 33 to clamp the gaff hook 32 in the inactive position shown in full lines, Figs. 3, 4 and 5, or the nut 35 can be loosened and the gaff hook 32 swung downwardly from the inactive position to the active position indicated by dot and dash lines in Fig. 4 and in which position it can be clamped by again screwing down the clamping nut 35. It will be noted that the gaff hook 32 is curved at its hooked end and when the hook is in its inactive position the curved portion is located in a recess 36 formed in the plate P while the hook on the end of the gaff hook is located in a recess 37 formed in the frame member 18. Consequently the gaff hook when in its inactive position is so disposed, and particularly the hooked end thereof, that it will not catch in the net proper or in underbrush, fishing lines or the like.

The gaff hook 32 fixedly carries a pin 38 which when the gaff hook is in its inactive position can be inserted into a hole 39 in the plate P to positively maintain the gaff hook in its inactive position. When the nut 35 is loosened the gaff hook may be moved outwardly to disengage the pin 38 from the hole 39 and then swung downwardly to its active dot and dash line position of Fig. 4. When the gaff hook is in its active position the pin 38 will register with a notch or opening 40 in the plate P and hence when the nut 35 is again tightened the pin 38 will be in the notch 40 and will act to positively hold the gaff hook against turning movement.

In Fig. 11 a modified and somewhat more simplified form of gaff hook and mounting therefor is illustrated. The gaff hook in this view is indicated at 32a and may be formed of suitable gauge steel wire which is bent to provide an eyelet 41 with the said eyelet 41 having an integral extension 42 that serves the function of the pin 38 previously referred to and which when the gaff is in inactive position will be engaged in the opening 39 in the plate and when the gauge is in active position will be in the notch or recess 40 thereof.

It will be understood that the gaff hook 32a is pivoted by means of the eye 41 on a screw 43 that is threaded in a tapped opening formed in the plate P and is provided at its outer end with a head 44. The frame portion 18 is provided with a recess 45 to accommodate the inner end of the screw 43 when said screw is screwed inwardly to clamp the gaff hook either in its inactive position or its active position.

The manner in which the net and the gaff are used will now be explained. Assuming that the fisherman has opened the net as indicated in Fig. 1 and that the positive latch means 22 is in latched position and that the gaffing hooks on the frame members 18 have been moved to and clamped in their active position he needs only in landing a fish to hold the net in one hand by the handle portions 17 thereof and pass the net in the usual manner under the fish until the fish is partially in the net and extends across the web W. He then by means of his thumb releases the latch means 22 and the frame members 15 and 16 of the net swing downwardly due to the hinge 19 and acting under the influence of the weight of the fish on the web W and possibly also under the influence of the hand pressure exerted by the fisherman. The downward swinging movement of the frame members 15 and 16 causes the gaffing hooks to follow the path indicated by the arrows in Fig. 2.

It will be noted that the path of movement of the gaffing hooks is not truly arcuate but may be described as having first an arcuate path of movement and then an inward and more nearly straight line path of movement. As the net approaches collapsed condition the gaffing hooks enter the fish until they reach the position indicated by full lines in Fig. 2. It will be seen that the fish is thus securely gaffed and as the fisherman raises the net to lift the fish from the water the weight of the fish will cause the gaffing hooks to enter still farther into the fish and thus positively prevent any likelihood of the fish struggling free from the net. The fisherman should time the release of the latching means 22 to occur when about a third of the length of the fish has passed over the web W and into the net as thus the gaff hooks will gaff the fish rearwardly of the gills and will enter the vital organs of the fish. It will be seen that the combined gaffing and landing net can be readily manipulated by one hand and will greatly facilitate the landing of a fish.

Although preferred embodiments of the invention have been illustrated and described herein it will be understood that the invention is susceptible of various modifications and adaptations within the scope of the appended claims.

Having thus described my invention, I claim:

1. A fishing gaff comprising a pair of frame members having juxtaposed handle portions and separated portions, a web interconnecting the ends of said separated portions, hinge means secured to and interconnecting said handle portions whereby said frame members may be swung about the hinge axis to move said separated portions from their maximum separated relationship toward each other, and gaff hooks secured to the ends of said separated portions adjacent to the ends of said web and extending in the direction of said movement of said separated portions.

2. A fishing gaff comprising a pair of frame members having juxtaposed handle portions and separated portions, a flexible web interconnecting the ends of said separated portions, hinge means interconnecting said handle portions and including hinge elements secured to said handle portions with the hinge axis extending longitudinally of the handle portions, whereby said frame members may be swung to move said separated portions toward each other from their maximum separated relationship, and gaff hooks secured to the ends of said separated portions adjacent to the ends of said web and extending in the direction of said movement of said separated portions.

3. A fishing gaff as defined in claim 1 and wherein said gaff hooks are pivotally mounted on the ends of said separated portions and can be swung to an active position wherein the gaff hooks are angularly disposed with respect to said separated portions or to inactive position wherein the gaff hooks extend parallel to said separated portions and lie closely against said portions, and means is provided for securing said gaff hooks in either active or inactive position.

4. A fishing gaff as defined in claim 2 and wherein said gaff hooks are pivotally mounted on the separated portions adjacent the ends thereof and can be swung to an active angularly disposed position with respect to said portions or an an inactive parallel position with respect thereto, and means is provided for securing said gaff hooks in either active or inactive position.

5. A combined fishing gaff and landing net comprising a pair of frame members having juxtaposed handle portions and separated bowed portions, a flexible web interconnecting the ends of said bowed portions, a net proper secured to said bowed portions and said web, hinge means interconnecting said handle portions to swing on a longitudinal axis from a position wherein said net is open to a position wherein said net is collapsed, and gaff hooks secured to the bowed portions adjacent the ends thereof and extending angularly with respect to said bowed portions and in the direction of the net collapsing movement of said bowed portions.

6. A combined fishing gaff and landing net comprising a pair of frame members having juxtaposed handle portions and separated bowed portions, a web interconnecting the ends of said bowed portions, a net proper secured to said web and said bowed portions, hinge means interconnecting said handle portions to swing about a longitudinal axis from a position wherein said net is open to one wherein it is collapsed and said bowed portions have moved toward each other, gaff hooks pivotally mounted on said bowed portions adjacent the ends thereof and movable from an inactive position wherein they extend longitudinally of and lie alongside the bowed portions to an active position wherein they extend substantially perpendicular to the bowed portions, and means for securing said gaff hooks in either active or inactive position.

7. A combined fishing gaff and landing net as defined in claim 6 and wherein said handle portions are provided with releasable latch means which when latched positively prevent movement of the handle portions about the hinge axis and collapsing of the net.

8. A combined fishing gaff and landing net as defined in claim 6 and wherein said bowed portions and said gaff hooks are provided with cooperating interengaging means when said hooks are in either active or inactive position to positively locate the hooks in such active or inactive position.

9. A combined fishing gaff and landing net as defined in claim 6 and wherein plates are secured to the outer sides of the bowed portions of said frame members adjacent the ends thereof while threaded clamping means are carried by said plates and pivotally mount said gaff hooks thereon to be swung thereabout to either active or inactive position and clamped in either position.

10. A combined fishing gaff and landing net as defined in claim 6 and wherein plates are secured to the outer sides of the bowed portions of the frame members adjacent the ends thereof and threaded adjustable means is carried by said plates and pivotally mount said gaff hooks thereon for movement to either active or inactive position and for clamping said hooks in either position, said hooks being provided on the plate sides thereof with pins engaging in cooperating means formed in said plates when said hooks are inactive or inactive position to positively maintain said hooks against swinging movement.

11. A combined fishing gaff and landing net as defined in claim 6 and wherein plates are secured to the outer sides of said bowed portions of said frame members adjacent the ends thereof, said plates rigidly supporting outwardly extending threaded studs, said gaff hooks being provided with openings through which said studs project, wherefore said hooks are pivotally connected to said plates, and clamping nuts on said studs outwardly of said hooks whereby said hooks may be swung to and clamped in either active or inactive position.

12. A combined fishing gaff and landing net as defined in claim 6 and wherein plates are rigidly secured to the outer sides of said bowed portions of said frame members, said plates being provided with threaded openings and said bowed portions being provided with recesses aligning with said openings, headed screws threaded into said openings and adapted to extend into said recesses, said gaff hooks being provided with eye portions through which said screws extend, wherefore said gaff hooks are pivotally mounted on said screws and can be swung to either active or inactive position and clamped in either position by said screws.

HARRY F. BALOUN.

REFERENCES CITED

The following references are of record in the file of this patent:

UNITED STATES PATENTS

| Number | Name | Date |
|---|---|---|
| 823,113 | French et al. | June 12, 1906 |
| 2,457,922 | Robinson | Jan. 4, 1949 |

FOREIGN PATENTS

| Number | Country | Date |
|---|---|---|
| 845,416 | France | Aug. 23, 1939 |